(12) United States Patent
Elgendi

(10) Patent No.: US 6,269,855 B1
(45) Date of Patent: Aug. 7, 2001

(54) MULTI-CHAMBER PNEUMATIC TIRE SYSTEM

(76) Inventor: Magdi K. Elgendi, 107 Mc Lean Ave. #4B, Yonkers, NY (US) 10705

( * ) Notice: Subject to any disclaimer, the term of this patent is extended or adjusted under 35 U.S.C. 154(b) by 0 days.

(21) Appl. No.: 09/364,147

(22) Filed: Jul. 30, 1999

(51) Int. Cl.[7] ................ B60C 5/20; B60C 5/24
(52) U.S. Cl. .................... 152/333.1; 152/331.1
(58) Field of Search .............. 152/333.1, 331.1

(56) References Cited

FOREIGN PATENT DOCUMENTS

677441 * 3/1930 (FR) .................. 152/333.1

* cited by examiner

Primary Examiner—Adrienne C. Johnstone

(57) ABSTRACT

A multi-chamber pneumatic tire system for compensating for a loss of air pressure within one chamber to permit continued use of the tire. The multi-chamber pneumatic tire system includes an outer tube housing having a plurality of interior walls to define a plurality of interior chambers, each of the chambers having a gas valve for filling the respective interior chamber with a gas. In an embodiment, the interior walls are flexible to permit gas pressure adjustment throughout the tube to provide a smoother ride when one of the interior chambers loses gas pressure.

12 Claims, 2 Drawing Sheets

MULTI-CHAMBER PNEUMATIC TIRE SYSTEM

BACKGROUND OF THE INVENTION

1. Field of the Invention

The present invention relates to pneumatic tires and more particularly pertains to a new multi-chamber pneumatic tire system for compensating for a loss of air pressure within one chamber to permit continued use of the tire.

2. Description of the Prior Art

The use of pneumatic tires is known in the prior art. More specifically, pneumatic tires heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 2,155,206; U.S. Pat. No. 3,106,951; U.S. Pat. No. 4,153,094; U.S. Pat. No. 5,538,061; U.S. Pat. No. 3,967,670; and U.S. Pat. No. 3,653,718.

While these devices fulfill their respective, particular objectives and requirements, the aforementioned patents do not disclose a new multi-chamber pneumatic tire system. The inventive device includes an outer tube housing having a plurality of interior walls to define a plurality of interior chambers, each of the chambers having a gas valve for filling the respective interior chamber with a gas. In an embodiment, the interior walls are flexible to permit gas pressure adjustment throughout the tube to provide a smoother ride when one of the interior chambers loses gas pressure.

In these respects, the multi-chamber pneumatic tire system according to the present invention substantially departs from the conventional concepts and designs of the prior art, and in so doing provides an apparatus primarily developed for the purpose of compensating for a loss of air pressure within one chamber to permit continued use of the tire.

SUMMARY OF THE INVENTION

In view of the foregoing disadvantages inherent in the known types of pneumatic tires now present in the prior art, the present invention provides a new multi-chamber pneumatic tire system construction wherein the same can be utilized for compensating for a loss of air pressure within one chamber to permit continued use of the tire.

The general purpose of the present invention, which will be described subsequently in greater detail, is to provide a new multi-chamber pneumatic tire system apparatus and method which has many of the advantages of the pneumatic tires mentioned heretofore and many novel features that result in a new multi-chamber pneumatic tire system which is not anticipated, rendered obvious, suggested, or even implied by any of the prior art pneumatic tires, either alone or in any combination thereof.

To attain this, the present invention generally comprises an outer tube housing having a plurality of interior walls to define a plurality of interior chambers, each of the chambers having a gas valve for filling the respective interior chamber with a gas. In an embodiment, the interior walls are flexible to permit gas pressure adjustment throughout the tube to provide a smoother ride when one of the interior chambers loses gas pressure.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new multi-chamber pneumatic tire system apparatus and method which has many of the advantages of the pneumatic tires mentioned heretofore and many novel features that result in a new multi-chamber pneumatic tire system which is not anticipated, rendered obvious, suggested, or even implied by any of the prior art pneumatic tires, either alone or in any combination thereof.

It is another object of the present invention to provide a new multi-chamber pneumatic tire system that may be easily and efficiently manufactured and marketed.

It is a further object of the present invention to provide a new multi-chamber pneumatic tire system that is of a durable and reliable construction.

An even further object of the present invention is to provide a new multi-chamber pneumatic tire system which is susceptible of a low cost of manufacture with regard to both materials and labor, and which accordingly is then susceptible of low prices of sale to the consuming public, thereby making such multi-chamber pneumatic tire system economically available to the buying public.

Still yet another object of the present invention is to provide a new multi-chamber pneumatic tire system which provides in the apparatuses and methods of the prior art some of the advantages thereof, while simultaneously overcoming some of the disadvantages normally associated therewith.

Still another object of the present invention is to provide a new multi-chamber pneumatic tire system for compensating for a loss of air pressure within one chamber to permit continued use of the tire.

Yet another object of the present invention is to provide a new multi-chamber pneumatic tire system which includes an outer tube housing having a plurality of interior walls to define a plurality of interior chambers, each of the chambers having a gas valve for filling the respective interior chamber with a gas. In an embodiment, the interior walls are flexible to permit gas pressure adjustment throughout the tube to provide a smoother ride when one of the interior chambers loses gas pressure.

Still yet another object of the present invention is to provide new multi-chamber pneumatic tire system that provides multiple interior walls to reinforce the structure of the tube.

Even still another object of the present invention is to provide a new multi-chamber pneumatic tire system that compensates for loss of gas pressure within any of the interior chambers to minimize the loss of effectiveness of the tire when any of the interior chambers loses gas pressure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
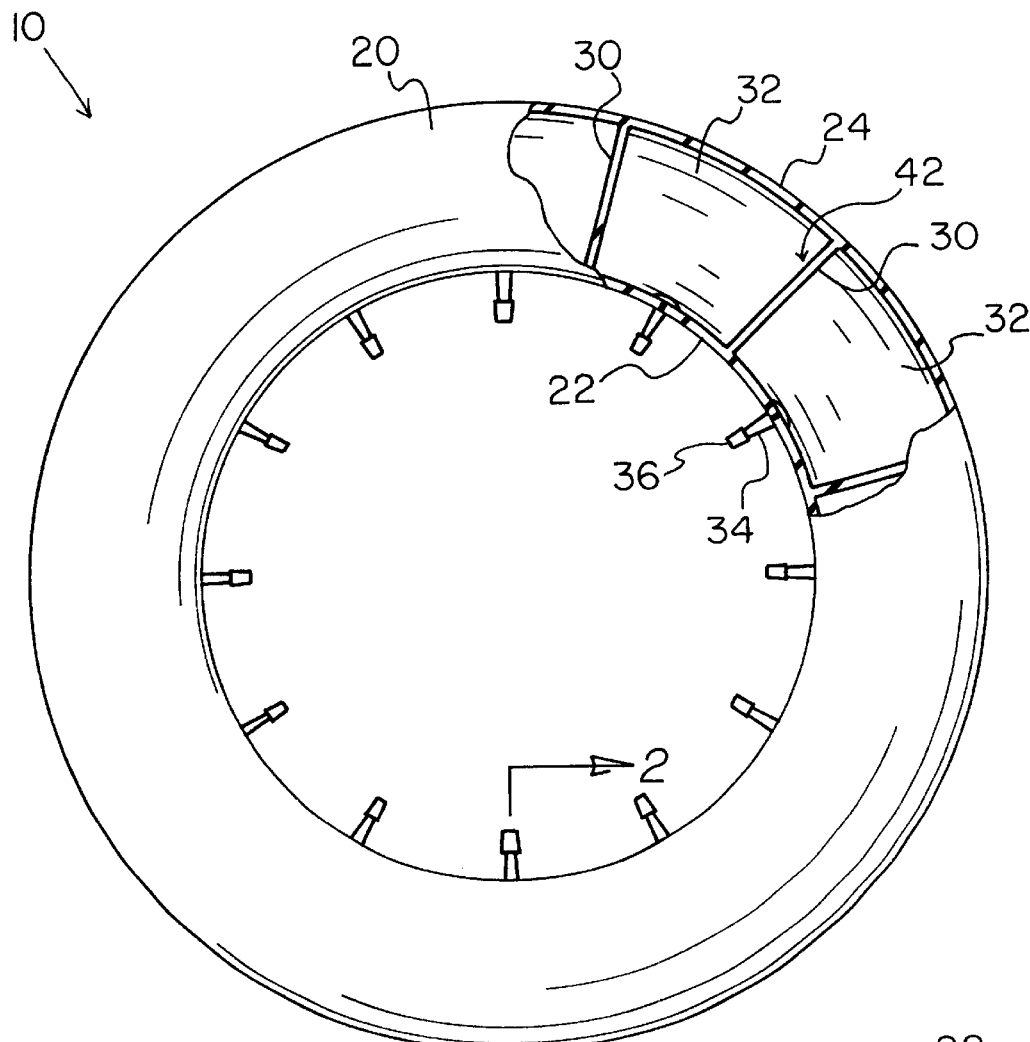
FIG. 1 is a partial cut-away front view of a new multi-chamber pneumatic tire system according to the present invention.
Figure 2:
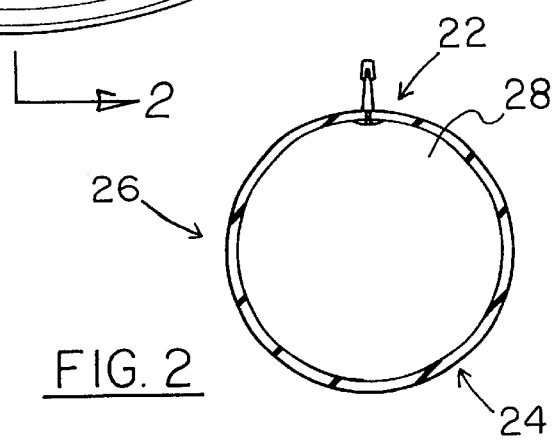
FIG. 2 is a cross-sectional view of the present invention taken along line 2—2 of FIG. 1.
Figure 3:
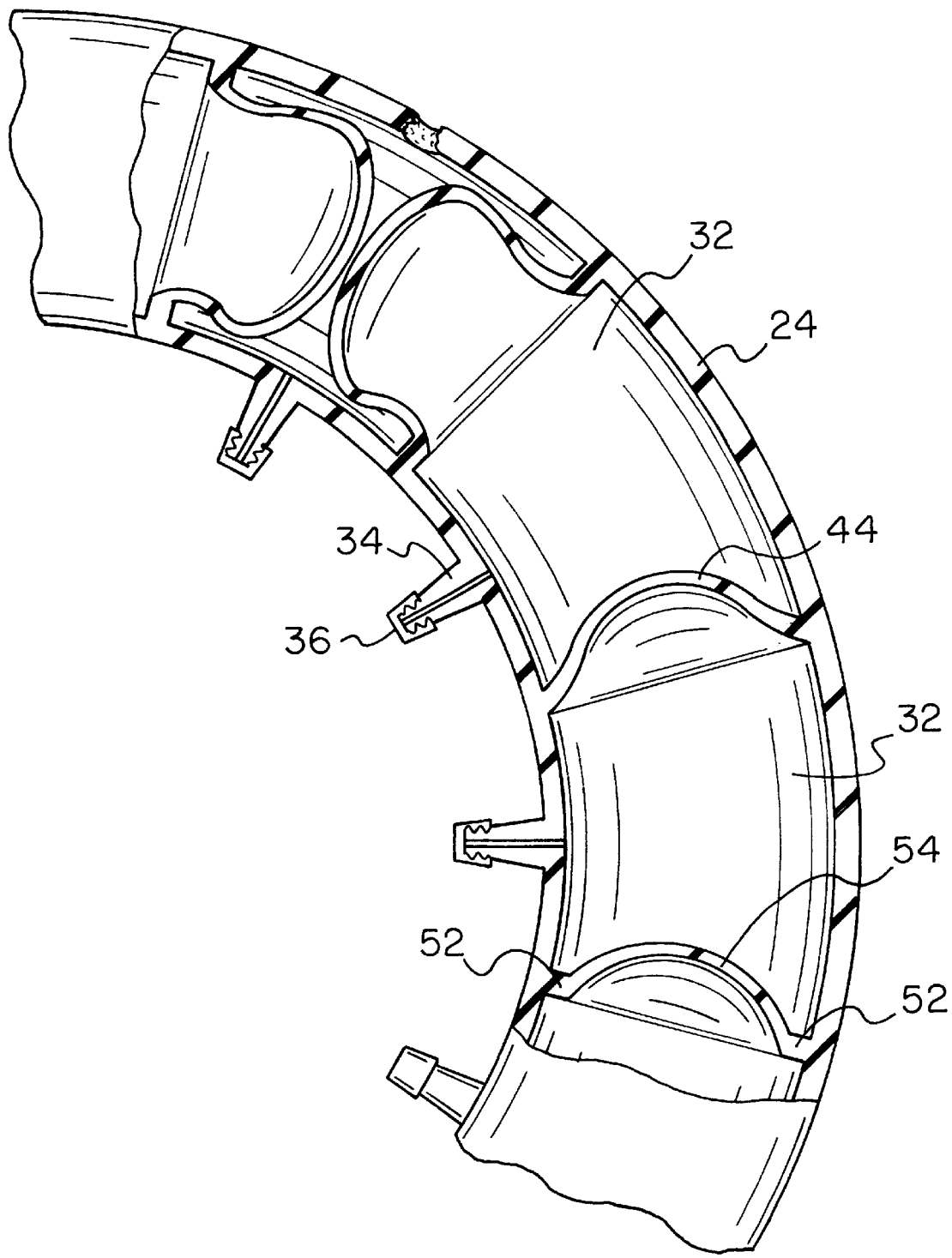
FIG. 3 is a cut-away view of a portion of an embodiment of the present invention.

With reference now to the drawings, and in particular to FIGS. 1 through 3 thereof, a new multi-chamber pneumatic tire system embodying the principles and concepts of the present invention and generally designated by the reference numeral 10 will be described.

As best illustrated in FIGS. 1 through 3, the multi-chamber pneumatic tire system 10 generally comprises a continuous annular tube 20 having an inner perimeter wall 22, an exterior perimeter wall 24, a pair of side walls 26 extending between the interior perimeter wall and the exterior perimeter wall, and a hollow interior 28.

The annular tube further includes a plurality of interior walls 30 dividing the hollow interior into a plurality of interior chambers 32. Each of the interior walls extends between the inner perimeter wall and the outer perimeter wall such that each interior wall lies in an associated plane extending through a center of the annular tube.

Each of the interior chambers includes an associated gas valve 34 extending through the inner perimeter wall for facilitating filling each interior chamber with a gas. Each gas valve extends radially inward from the inner perimeter wall, the gas valves being positioned in an equidistantly spaced relationship around the inner perimeter wall. In an embodiment, each of the gas valves is positioned generally at a mid-point between two adjacent interior walls for facilitating locating of the interior walls within the annular tube. Thus, visual inspection of the interior walls is facilitated when checking for potential damage to interior walls as well as to the inner, outer, and side walls of the annular tube when the tube is punctured. Each gas valve has an associated cap 36 coupled to a distal end of the gas valve.

In an embodiment, each interior wall comprises a generally planar rigid member 42 for providing structural support between the inner perimeter wall and the outer perimeter wall.

In an embodiment, each interior wall comprises a resilient flexible member 44 as shown in FIG. 3 whereby a loss of gas pressure within an adjacent interior chamber urges the resilient flexible member inwardly towards the adjacent chamber.

In an embodiment, each interior wall comprises a rigid outer portion 52, such as shown in FIG. 3, and a resilient flexible inner portion 54, also shown in FIG. 3, whereby a loss of gas pressure within an adjacent interior chamber urges the resilient flexible inner portion inwardly towards the adjacent chamber.

In use, the annular tube is positioned around a tire rim that is adapted to receive multiple gas valves. A tire shell is then positioned around the annular tube and each interior chamber is pressurized to a desired level of firmness to provide maximum tire performance.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pneumatic tire system, comprising:

a continuous annular tube;

said annular tube having an inner perimeter wall, an exterior perimeter wall, a pair of side walls extending between said interior perimeter wall and said exterior perimeter wall, and a hollow interior;

said annular tube further having a plurality of interior walls dividing said hollow interior into a plurality of interior chambers;

each of said interior chambers having an associated gas valve extending through said inner perimeter wall for facilitating filling each interior chamber with a gas; and wherein each interior wall comprises a generally planar rigid member for providing structural support between said inner perimeter wall and said outer perimeter wall.

2. The pneumatic tire system of claim 1, further comprising:
  each of said interior walls extending between said inner perimeter wall and said outer perimeter wall such that each interior wall lies in an associated plane extending through a center of said annular tube.

3. The pneumatic tire system of claim 1, further comprising:
  each gas valve extending radially inward from said inner perimeter wall, said gas valves being positioned in an equidistantly spaced relationship around said inner perimeter wall.

4. The pneumatic tire system of claim 3, further comprising:
  each of said gas valves being positioned generally at a mid-point between two adjacent interior walls for facilitating locating of said interior walls within said annular tube.

5. The pneumatic tire system of claim 1, wherein each gas valve has an associated cap coupled to a distal end of the gas valve.

6. The pneumatic tire system of claim 1 further comprising:
  each of said interior walls extending between said inner perimeter wall and said outer perimeter wall such that each interior wall lies in an associated plane extending through a center of said annular tube;
  each gas valve extending radially inward from said inner perimeter wall, said gas valves being positioned in an equidistantly spaced relationship around said inner perimeter wall;
  each of said gas valves being positioned generally at a mid-point between two adjacent interior walls for facilitating locating of said interior walls within said annular tube; and
  wherein each gas valve has an associated cap coupled to a distal end of the gas valve.

7. A pneumatic tire system, comprising:
  a continuous annular tube;
  said annular tube having an inner perimeter wall, an exterior perimeter wall, a pair of side walls extending between said interior perimeter wall and said exterior perimeter wall, and a hollow interior;
  said annular tube further having a plurality of interior walls dividing said hollow interior into a plurality of interior chambers;
  each of said interior chambers having an associated gas valve extending through said inner perimeter wall for facilitating filling each interior chamber with a gas; and
  wherein each interior wall comprises a rigid outer portion and a resilient flexible inner portion whereby a loss of gas pressure within an adjacent interior chamber urges said resilient flexible inner portion inwardly towards said adjacent chamber.

8. The pneumatic tire system of claim 7, further comprising:
  each of said interior walls extending between said inner perimeter wall and said outer perimeter wall such that each interior wall lies in an associated plane extending through a center of said annular tube;
  each gas valve extending radially inward from said inner perimeter wall, said gas valves being positioned in an equidistantly spaced relationship around said inner perimeter wall;
  each of said gas valves being positioned generally at a mid-point between two adjacent interior walls for facilitating locating of said interior walls within said annular tube; and
  wherein each gas valve has an associated cap coupled to a distal end of the gas valve.

9. The pneumatic tire system of claim 7, further comprising:
  each of said interior walls extending between said inner perimeter wall and said outer perimeter wall such that each interior wall lies in an associated plane extending through a center of said annular tube.

10. The pneumatic tire system of claim 7, further comprising:
  each gas valve extending radially inward from said inner perimeter wall, said gas valves being positioned in an equidistantly spaced relationship around said inner perimeter wall.

11. The pneumatic tire system of claim 10, further comprising:
  each of said gas valves being positioned generally at a mid-point between two adjacent interior walls for facilitating locating of said interior walls within said annular tube.

12. The pneumatic tire system of claim 7, wherein each gas valve has an associated cap coupled to a distal end of the gas valve.

* * * * *